United States Patent
Nedstedt

[19]
[11] Patent Number: 5,971,627
[45] Date of Patent: Oct. 26, 1999

[54] METHOD FOR OPTICALLY CONNECTING AN OPTICAL ELEMENT, FOR EXAMPLE AN END PORTION OF AN OPTICAL FIBRE, WITH A LENS

[75] Inventor: Bo Nedstedt, Gnosjö, Sweden

[73] Assignee: Formex AB, Anderstorp, Sweden

[21] Appl. No.: 08/943,762

[22] Filed: Oct. 3, 1997

[30] Foreign Application Priority Data

Nov. 1, 1996 [SE] Sweden ................ 9604007-6

[51] Int. Cl.[6] .................. G02B 6/00; G02B 6/36
[52] U.S. Cl. ............................... 385/61; 359/642
[58] Field of Search ................... 385/60–61, 147, 385/88, 92; 359/740, 641–647, 359, 454, 580, 601; 65/35, 56, 70, 97, 105, 112, 177, 183

[56] References Cited

U.S. PATENT DOCUMENTS

| | | | |
|---|---|---|---|
| 4,015,897 | 4/1977 | Konoma et al. | 359/740 |
| 4,096,315 | 6/1978 | Kubacki | 351/166 |
| 4,765,729 | 8/1988 | Taniguchi | 359/580 |
| 5,276,538 | 1/1994 | Monli et al. | 359/454 |
| 5,539,971 | 7/1996 | Kelly | 29/418 |
| 5,694,240 | 12/1997 | Sternbergh | 359/359 |
| 5,760,885 | 6/1998 | Yokoyama et al. | 356/4.01 |

*Primary Examiner*—Akm E. Ullah
*Attorney, Agent, or Firm*—Baker & Daniels

[57] ABSTRACT

A method for optically connecting an optical element, including glass, for example an end portion of an optical fibre having a core consisting of glass, to a lens consisting of glass. The optical element and the lens are fixed in a connector element in a pre-determined position in relation to each other and the surface of the lens facing the optical element is treated with an anti-reflection agent, for example magnesium fluoride. The thickness of the layer of the anti-reflection agent is adapted with regard to the refractive index of the glass of the optical element, the refractive index of the glass of the lens and the wave length of the light which is transmitted through the system so that the light transmission of the optical connection will be as high as possible and so that the reflections in the connection are thereby as low as possible.

18 Claims, 1 Drawing Sheet

METHOD FOR OPTICALLY CONNECTING AN OPTICAL ELEMENT, FOR EXAMPLE AN END PORTION OF AN OPTICAL FIBRE, WITH A LENS

FIELD OF THE INVENTION

The present invention relates to a method for optically connecting an optical element, for example an end portion of an optical fibre, with a lens.

BACKGROUND OF THE INVENTION

In optical fibre systems there are at different points required optical connections between the optical elements included in the system. Thus, there is required connections between different lengths of optical fibres, between an optical fibre and a light source, for example a diode, between an optical fibre and a light detector and so on. Each connection must be established while using very great accuracy if it shall be possible to keep the losses at a minimum. Of course, the problem of providing a correct connection is increased by the fact that optical fibres have a very small cross sectional area. Thus, the small cross sectional area provides that substantial losses appear also at small deviations from a correct relative position between the two fibre end portions, i.e. at deviations from the position in which the fibre end portions are positioned on a common optical axis. Also dirt represents a substantial risk as the dirt can easily reduce the already small transmission area.

Different methods for providing a correct connection of optical fibres with each other and with other optical elements have been suggested. In such previously known methods there are used lenses in which the light beam is magnified so that the light transmission in the connection takes place at a sectional area which is magnified several times providing for a corresponding reduction of the sensitivity to deviations from a correct position, dirt and so on. Thereby, it is a drawback that the connection of for example two fibre end portions to each other requires instead of one single connection, i.e. the connection between the fibre end portions, an optical connection of the fibre end portions to one lens each and an optical connection of the lenses to each other, i.e. three connections. Thereby, it is important that the optical fibres and the lens are positioned on the same optical axis as well as that the end surfaces of the fibres are positioned in the focus of the lens in question. Thus, the connection between the optical fibres and the lenses constitutes the most sensitive part of the connection system while the optical connection of the lenses to each other can easily be provided without errors.

Especially in such connections in which there is spaces between fibre/fibre, fibre/lens and lens/lens a fraction of the light is reflected back through the optical elements towards the light source. In some cases this results only in a loss in the direction of transmission of the light corresponding to the light which is reflected backwardly. In other cases in which for example a laser diode is used as a light source the light reflected back towards the laser diode is fatal to the transmission. The reflection disturbs the laser so that this is prevented from sending digital impulse sequences in a way free from interferences.

In 1-fibre systems in which also a fibre from a photo diode is connected with the transmission fibre reflections can disturb a receiving function which is intended for receiving external signals.

There are different previously known methods for reducing the reflections, i.e. for increasing the return damping to a value of about 30 dB or more, and if the effect of the reflections is decreased to such low values they are too week to be able to disturb the transmission of light impulses from the laser diode.

Low reflection levels can be obtained by providing an optimum value of the light transmission in the transmission direction of the light source. Such an optimum value can be provided by anti-reflection treatment of all surfaces extending transversely of the optical axis including such surfaces of the fibres which extend transversely. The anti-reflection treatment can for example be provided by coating the surfaces with magnesium fluoride. However, the anti-reflection treatment of the fibre end surfaces is a very impractical method with regard to the fact that the user of an easily applicable fibre connector device is forced to complicated operations before the fibre can be mounted in the connector device.

It is also possible to provide index matching means, such as gel, transparent silicon rubber pads and the like between the optical elements with the object of eliminating the air space between the elements and thereby reducing the reflections. However, it is a drawback that these agents at the same time reduce the transmission level in the direction of transmission as these agents per se constitute new optical elements having worse light transmission performances than optical glass, fibre materials and the like. In impure condition they can also cause a heavily decreased transmission by introducing dirt particles into the optical axis. Also aging of such index matching agents can provide the agent with bad optical properties.

It is possible also to reduce reflections in connectors between lens and fibre by positioning the elements in engagement with each other and thereby eliminating the air space. In this method there is used such a glass in the lens that the focus will be positioned in the surface of the lens. However, this provides only for a partial reduction of the reflections and not a reduction to the low levels as required.

SUMMARY OF THE INVENTION

The object of the invention is to provide such an effective connection between an optical element, for example an end portion of an optical fibre, and a lens that the reflections are reduced to sufficiently small values so as not to disturb the transmission function, for example the transmission of light impulses from a laser diode.

In order to comply with this object there is according to the invention provided a method for optically connecting an optical element, for example an end portion of an optical fibre, with a lens, in which the optical element and the lens are fixed in a connector element in a predetermined position in relation to each other and the surface of the lens facing the optical element is treated with an anti-reflection agent, for example magnesium fluoride, the method being characterized in that the anti-reflection agent, for example the magnesium fluoride is applied to the surface of the lens facing the optical element in the form of a layer having a thickness which is in such a way adapted to the refraction index of the glass of the optical element, the refraction index of the glass of the lens and the wave length of the light which is sent through the system that the light transmission in the connection is as high as possible and the refraction in the connection is as low as possible.

In the method according to the invention it is preferred that the optical element and the lens are fixed in engagement with each other in the connector element. The optical element is usually constituted by an optical fibre, and thereby the anti-reflection agent, for example the magnesium fluoride, is applied as a layer having a thickness which is adapted to the refractive index of the glass of the core of the optical fibre, the refractive index of the glass of the lens and the wave length of the light which is transmitted through the system.

When optically connecting two optical elements, for example the end portions of two optical fibres, with each other, each of the optical elements is optically connected with one lens as described above whereupon the lenses are optically connected with each other, the surfaces of the lenses facing each other being provided with an anti-reflection agent, for example magnesium fluoride, in the form of a layer having a thickness which is adapted to the refractive index of the glass of the lenses, the refractive index of the medium positioned between the lenses, preferably air, and to the wave length of the light transmitted through the system in such a way that the light transmission between the lenses of the connector will be as high as possible and the reflection will be as low as possible.

The invention shall be described in the following with reference to the accompanying drawings.

DESCRIPTION OF THE PREFERRED EMBODIMENT

Figure 1:
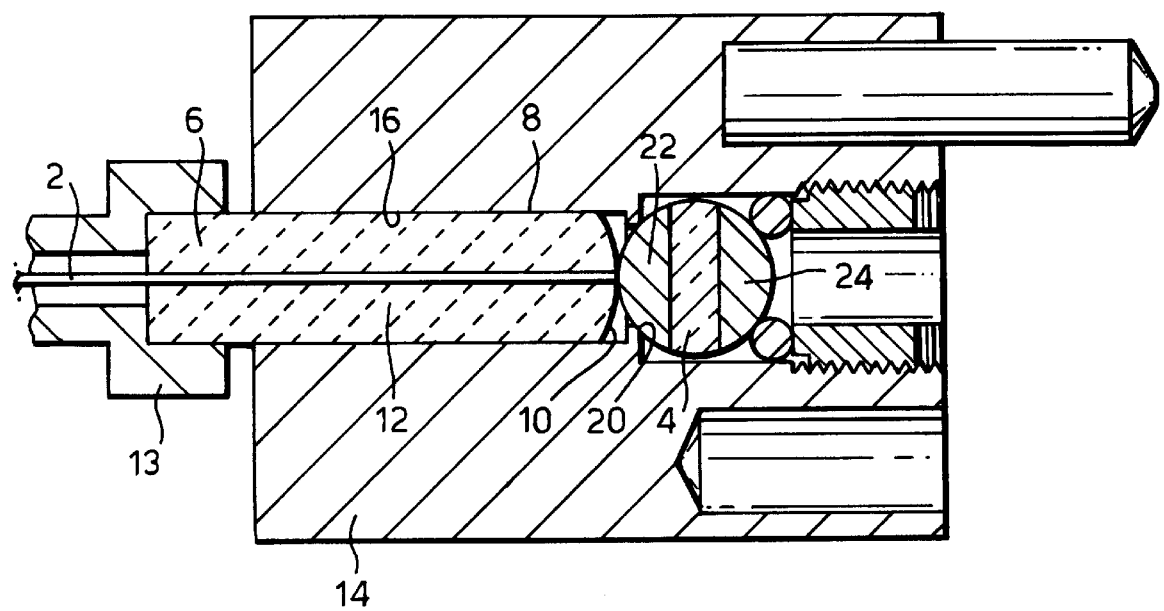
FIG. 1 is a schematic section of a connector element for optically connecting an end portion of an optical fibre with a spherical lens in accordance with the method of the invention.
Figure 2:
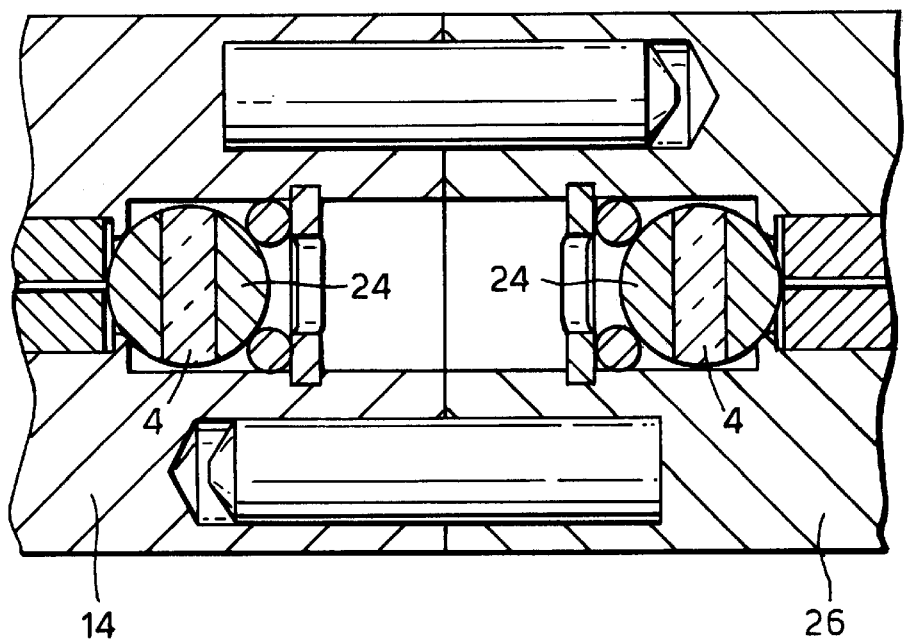
FIG. 2 is a schematic section of a connection between two connector elements in which an end portion of an optical fibre is connected with a spherical lens.

In accordance with the method of the invention for connecting an optical fibre 2 with a spherical lens 4 the end portion of the optical fibre 2 is enclosed in a fibre retainer 6 in the form of a sleeve. The fibre retainer 6 has a cylindrical outer surface 8 which connects with a flat or spherical end surface 10 on the fibre retainer 6. The main portion of the fibre retainer 6 is constituted by a cylindrical element 12 of ceramic material and the outer end portion of the cylindrical element 12 consisting of ceramical material is forced into and fixed in a portion 13 consisting of metal.

The optical fibre 2 is fixed in the fibre retainer 6 in accordance with any method known per se, for example by means of an adhesive, the end surface of the optical fibre 2 being after grinding to a flat or spherical shape positioned in the same plane as the end surface 10 of the cylindrical element 12.

In order to connect the retainer 6 so that the optical fibre positioned therein is positioned in engagement with the spherical lens 4 there is used a connector element 14. The connector element 14 is provided with surfaces for defining the relative position between the retainer 6 and thereby the optical fibre 2 and the spherical lens 4. The surfaces of the connector element 14 for defining the relative position between the fibre retainer 6 and thereby the optical fibre 2 and the spherical lens 4 are constituted by a cylindrical surface 16 and a circular edge surface 20 which is concentric with the cylindrical surface 16 and is formed with a radius.

Thus, the position of the retainer 6 and thereby the optical fibre 2 is defined in the connector element 14 by the fact that the cylindrical surface 8 of the retainer 6 engages the cylindrical surface 16 of the connector element 14 and by the fact that the end surface 10 of the retainer 6 and the optical fibre 2 engages the spherical lens 4 which is in turn defined with regard to its position by the circular edge surface 20 of the connector element 14, said surface being formed with a radius.

The fibre retainer 6 can be retained in an engagement with the surface 16 and the spherical lens 4 by means of a conventional sleeve screw or by means of a compression spring.

The spherical lens 4 can be maintained in engagement with the edge surface 20 by means of for example a sleeve screw or by means of an annular spring. In order to provide an optical connection between the fibre 2 and the spherical lens 4 engaging each other, which connection is as efficient and reflection-free as possible the lens 4 is at its surface facing the fibre 2 provided with an anti-reflection treatment 22 of for example magnesium fluoride to such a thickness that there is provided a maximum light transmission and a minimum reflection level.

In order to define the thickness of the layer of the anti-reflection treatment 22 the following factors are considered: the refraction index of the core of the optical fibre 2, consisting of glass, the refraction index of the glass of the lens 4, and the wave length or wave lengths of the light which is transmitted through the system.

In order to provide a connection between the lens 4 and the lens 4 positioned in the opposite connector element 26 positioned with intermediate air which connection is as effective and free from reflection as possible, the outer surfaces of the lenses are anti-reflection treated at 24 by means of for example magnesium fluoride to such a thickness that a maximum transmission level and a minimum reflection level are obtained.

In order to define the thickness of the layers of the anti-reflection treatment 24 there are considered: the refraction index of the lens glass 4, the refraction index of air which has the value 1,0, and the wave length or wave lengths of the light which is transmitted through the system.

It is realized that the method according to the invention can be utilized for connecting other optical elements than optical fibres to a lens and it is of course also possible that the lens is of another kind than a spherical lens. For example it is possible to connect a diode with a lens using the method according to the invention.

I claim:

1. A method for optically connecting an optical element, including glass, for example an end portion of an optical fibre having a core consisting of glass, with a lens consisting of glass, wherein the optical element and the lens are fixed in a connector element in a predetermined position in relation to each other and the surface of the lens facing the optical element is treated with an anti-reflection agent, for example magnesium fluoride, characterized in that the anti-reflection agent, for example the magnesium fluoride, is applied to the surface of the lens facing the optical element as a layer having a thickness adapted to the refractive index of the glass of the optical element, the refractive index of the glass of the lens and the wave length of the light which is transmitted through the system in such a way that the light transmission of the connection is as high as possible and the reflection in the connection is as low as possible.

2. A method as claimed in claim 1, characterized in that the optical element and the lens are fixed in engagement with each other in the connector element.

3. A method as claimed in claim 2, wherein the optical element is constituted by an optical fibre, characterized in that the anti-reflection agent for example the magnesium fluoride, is applied as a layer having a thickness adapted to the refractive index of the glass of the core of the optical fibre, the refractive index of the glass of the lens and the wave length of the light transmitted through the system.

4. A method for optically connecting two optical elements, for example the end portions of two optical fibres, with each other, wherein each of the optical elements is optically connected with a lens according to the method as claimed in any of claims 1–3 and the lenses are optically connected with each other, characterized in that the surfaces of the lenses facing each other are provided with an anti-reflection agent, for example magnesium fluoride, in the form of a layer having a thickness adapted in such a way to the refractive index of the glass of the lenses, the refractive index of the medium positioned between the lenses, and the wave length of the light which is transmitted through the system that the light transmission between the lenses of the connection is as high as possible and the reflection is as low as possible.

5. A method as claimed in claim 4, characterized in that the medium positioned between the lenses is constituted by air.

6. A method as claimed in claim 5, characterized in that the optical element is fixed in a retainer and that the retainer and the lens are fixed in the connector element.

7. A method as claimed in claim 6, characterized in that the retainer for the optical element is fixed in the connector element by means of a sleeve screw.

8. A method as claimed in claim 6, characterized in that the retainer for the optical element is fixed in the connector element by means of a spring.

9. A method as claimed in claim 6, characterized in that the lens is fixed in the connector element by means of a sleeve screw.

10. A method as claimed in claim 6, characterized in that the lens is fixed in the connector element by means of an annular spring.

11. A method as claimed in claim 6, characterized in that the lens is fixed in the connector element by means of an adhesive.

12. A method as claimed in claim 1, wherein the optical element is constituted by an optical fibre, characterized in that the anti-reflection agent for example the magnesium fluoride, is applied as a layer having a thickness adapted to the refractive index of the glass of the core of the optical fibre, the refractive index of the glass of the lens and the wave length of the light transmitted through the system.

13. A method as claimed in claim 1, characterized in that the optical element is fixed in a retainer and that the retainer and the lens are fixed in the connector element.

14. A method as claimed in claim 1, characterized in that he retainer for the optical element is fixed in the connector element by means of a sleeve screw.

15. A method as claimed in claim 1, characterized in that the retainer for the optical element is fixed in the connector element by means of a spring.

16. A method as claimed in claim 1, characterized in that the lens is fixed in the connector element by means of a sleeve screw.

17. A method as claimed in claim 1, characterized in that the lens is fixed in the connector element by means of an annular spring.

18. A method as claimed in claim 1, characterized in that the lens is fixed in the connector element by means of an adhesive.

* * * * *